United States Patent [19]

Shull

[11] 4,405,223

[45] Sep. 20, 1983

[54] PISTOL GRIP

[75] Inventor: Steven W. Shull, Culver City, Calif.

[73] Assignee: Vivitar Corporation, Santa Monica, Calif.

[21] Appl. No.: 349,922

[22] Filed: Feb. 18, 1982

[51] Int. Cl.³ ............................................. G03B 17/56
[52] U.S. Cl. ....................................... 354/293; 354/82
[58] Field of Search ......................... 354/81, 82, 293; 352/243; 362/3, 8, 9, 11

[56] References Cited

U.S. PATENT DOCUMENTS

| 2,961,937 | 11/1960 | Karpf | 354/82 |
| 3,301,627 | 1/1967 | Kimura | 354/82 X |
| 3,333,519 | 8/1967 | Padelt | 354/82 |
| 4,097,883 | 6/1978 | Adamski et al. | 354/293 |
| 4,134,662 | 1/1979 | Kawazoe | 354/293 |
| 4,291,967 | 9/1981 | Jackson | 354/293 |
| 4,329,041 | 5/1982 | Madge et al. | 354/293 |

Primary Examiner—John Gonzales

Attorney, Agent, or Firm—Lyon & Lyon

[57] ABSTRACT

There is disclosed herein an interchangeable left-to-right pistol grip and bracket device onto which a camera and flash unit can be mounted. A camera bracket attaches to either side of the pistol grip body, and the grip includes a strap for encompassing the hand of the user. The strap also is reversible to the side of the grip body opposite that onto which the camera bracket is placed. The top of the body of the grip includes a shoe for receiving a flash unit. The handle of the pistol grip is disposed at an angle with respect to the body thereof and to a mounting flange for the camera bracket, and thereby provides a more comfortable grip when using either a 35 mm SLR or a medium format (single or twin lens reflex) camera. Furthermore, the grip may include a receptacle therein for receiving batteries, as well as appropriate electrical connections to an on/off switch and outlet power plug. This latter arrangement enables additional power to be supplied to a flash unit attached to the pistol grip.

8 Claims, 4 Drawing Figures

U.S. Patent   Sep. 20, 1983   4,405,223
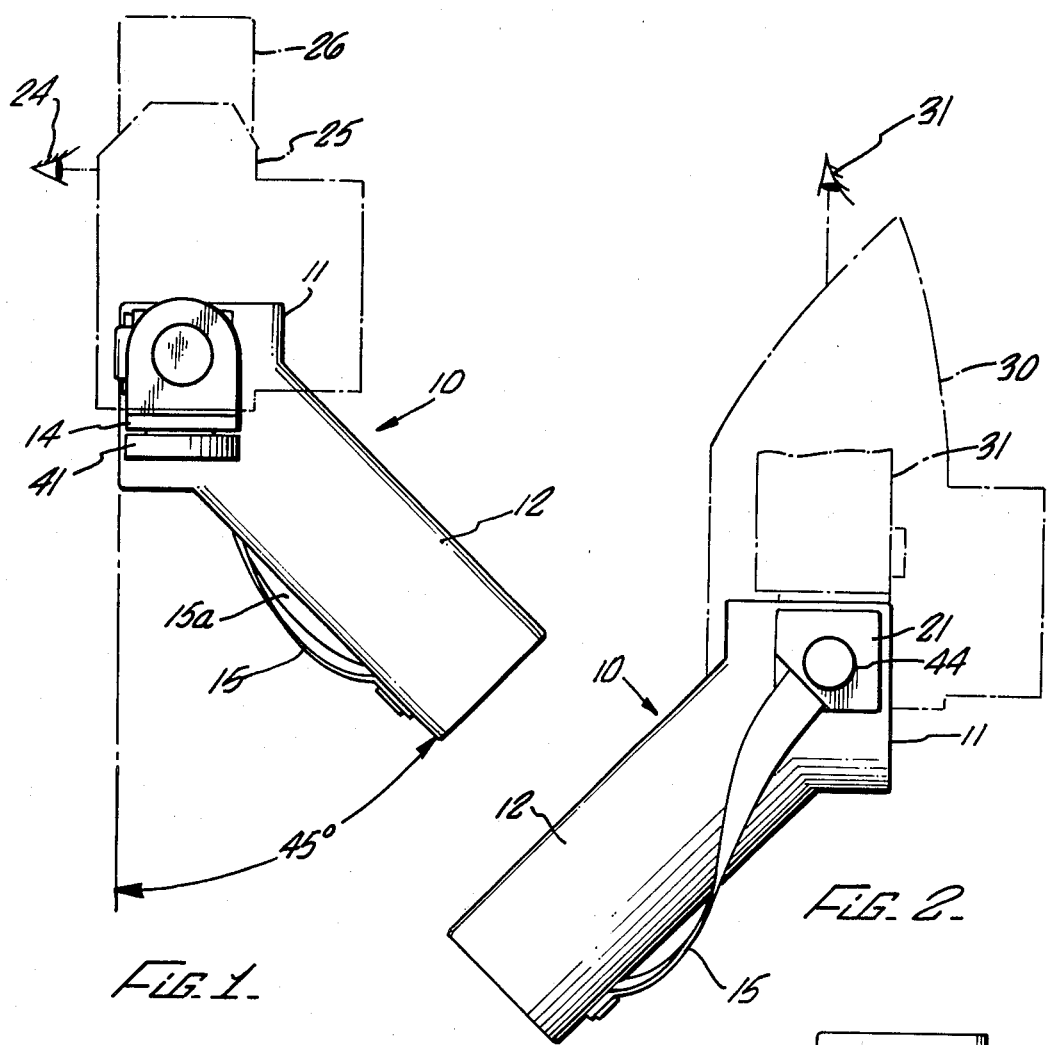
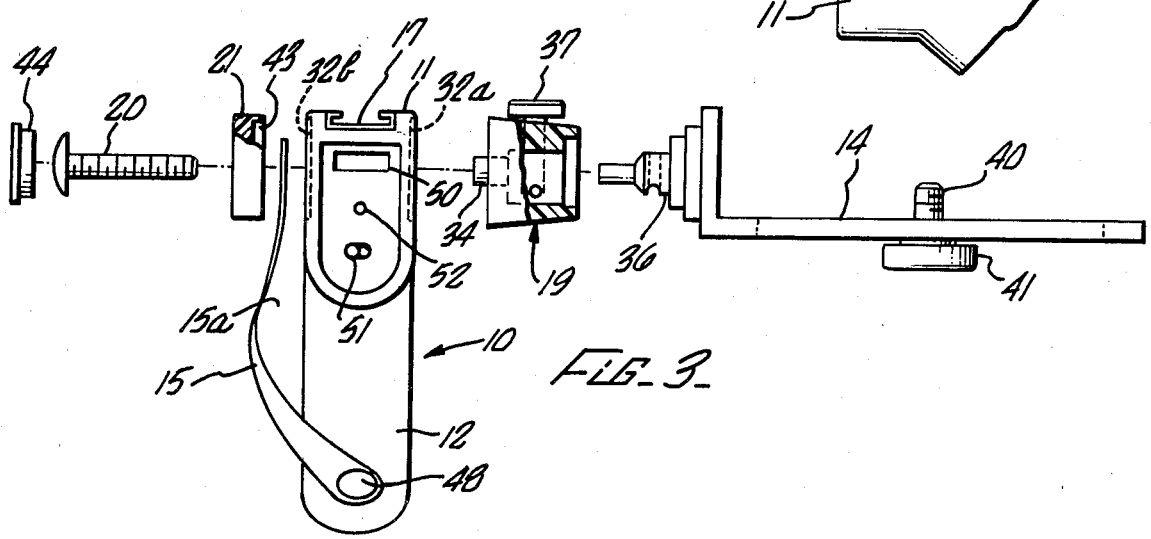

PISTOL GRIP

BACKGROUND OF THE INVENTION

The present invention relates to the field of photography, and more particularly to a new form of pistol grip for cameras and flash units.

Various forms of pistol grips or handles have been provided for cameras, electronic flash units, or both. In each instance, the grip is of a suitable elongated form to allow the same to be held and gripped by the hand of the user. Some include various related accessory items, such as detachable straps, tilt heads and the like. Such grips generally are designed for one form of camera (e.g., 35 mm SLR) and are not usually conveniently and comfortably useable with other forms of cameras.

SUMMARY OF THE INVENTION

The pistol grip of the present invention provides an improved form of pistol grip because of the manner in which the handle of the grip is angled with respect to the grip body and consequently with respect to a camera bracket and a flash unit shoe. Additionally, the camera bracket assembly is readily reversible from one side to the other of the body of the grip, as is a hand strap, to allow the pistol grip to be comfortably used in the right hand or in the left hand of the photographer. The construction of the grip allows different format cameras to be used while maintaining the camera and flash unit in a proper relationship and with the handle of the grip at a convenient and comfortable position during shooting. It allows, for example, the "shooting" arm of the photographer to be tucked against his body. Furthermore, the body of the grip can include a receptacle for batteries, as well as a suitable electrical switch and power cord for providing a booster power supply for an associated electronic flash unit.

Accordingly, a feature of the present invention is the provision of an improved form of pistol grip for photographic purposes.

Another feature of the present invention is to provide a pistol grip having a handle disposed at an angle with respect to a camera bracket to thereby providing a more comfortable form of grip.

An additional feature of the present invention is to provide a convenient form of interchangeable left-to-right camera bracket and strap for a pistol grip.

BRIEF DESCRIPTION OF THE DRAWINGS

These and other objects and features of the present invention will become better understood through a consideration of the following description taken in conjunction with the drawing in which:

FIG. 1 is a side elevational view of a pistol grip according to the present invention arranged for use with a 35 mm single lens reflex camera;

FIG. 2 is a similar side elevational view of the handle of the present invention arranged for use with a medium format camera with waist level viewfinder;

FIG. 3 is a view of the handle arrangement of FIG. 1, but exploded to better illustate the components thereof; and FIG. 4 is a partial view of the body portion of the pistol grip.

DETAILED DESCRIPTION OF THE PREFERRED EMBODIMENT

Turning now to the drawing, a power pistol grip according to the present invention is indicated at 10, and the same comprises a body 11 and a handle 12. The pistol grip further includes a camera mounting bracket 14 and a hand strap 15. The upper part of the body 11 of the grip 10 includes a rotatable shoe 17 (note FIG. 3) for receiving an electronic flash unit (eg, 31 of FIG. 2 or 26 of FIG. 1). The camera bracket 14 is attached to the body 11 of the grip 10 by means of a bracket connector 19 and screw 20. These components also secure a handstrap cap 21 to the body 11 of the grip 10. The cap 21 secures the upper end of the strap 15 to the body 11. The particular manner of attachment and of interchanging the bracket 14 (and strap 15) from one side to the other of the body 11 will be discussed in more detail later.

With the arrangement as shown in FIG. 1, the photographer's head would be to the left in the drawing, with the photographer's eye 24 positioned for shooting generally as indicated in FIG. 1 with respect to the viewfinder of a 35 mm single lens reflex camera 25. An electronic flash unit is indicated at 26. With the arrangement of FIG. 1, it will be appreciated that the grip 10 is held in the left hand of the photographer and with the camera 25 and camera bracket 14 extending to the right from the body 11 of the grip (out of the plane of the drawing). It also will be seen that with this arrangement the handle 12 is angled forwardly and downwardly (approximately 45° shown). The hand of the photographer can extend through a loop 15a formed between the hand strap 15 and the left side (not seen in FIG. 1) of the handle 12. This provides a particularly comfortable arrangement of the handle 12 for the photographer, considering the fact that the camera 25 is held in front of his eye and, consequently, the handle 12 likewise is disposed close to the photographer's face. This also allows the arm (of the hand in which the handle is held) to be tucked against the body. This arrangement, with the angled handle 12, is substantially more comfortable than the usual handle or grip which extends directly vertical with respect to the camera (and normal to the optical axis of the lens of the camera).

FIG. 2 shows the pistol grip 10 with a medium format camera 30 (such as a single or twin lens reflex camera with a waist level viewfinder) attached to the camera bracke (which is not seen in FIG. 2 since it would be disposed into the drawing as shown) and an electronic flash unit indicated at 31 attached to the shoe 17. In this case, the camera and pistol grip are held at about waist level, and this arrangement is particularly comfortable with the handle 12 angling rearwardly and downwardly in this case as seen in FIG. 2. The photographer's eye is indicated at 31. In the arrangement of FIG. 2, the camera bracket 14 and camera 30 are disposed on the left side of the body 11 and handle 12 (into the drawing) as used by the photographer with the handle 12 in his right hand; whereas, in the arrangement of FIG. 1 the bracket 14 and camera 25 are disposed on the right side as used in his left hand. However, the camera in either case can be interchanged to the opposite side with either of the arrangements of FIG. 1 or 2 by simply reversing the camera bracket 14, and the bracket connector 19 and other components as will be further described below.

Turning now particularly to FIGS. 3 and 4, the exploded view of FIG. 3 illustrates the manner in which the components of the pistol grip are secured together to attach the bracket 14 extending from the right side of the body 11 and handle 12 of the grip 10 to provide the camera mounting arrangement of FIG. 1 (as well as the arrangement of FIG. 2). The body 11 of the pistol grip 10 includes square recesses 32a and 32b on the right and left sides thereof, respectively, as indicated in FIGS. 3 and 4. These recesses are the same shape and configuration as the mating ends of the bracket 19 and strap cover 21 so that the connector 19 and cover 21 are secured in a predetermined orientation with respect to the body 11 and do not rotate with respect thereto during use. The bracket connector 19 has a threaded stud 34 into which the screw 20 is threaded.

The camera bracket 14 includes a plate assembly 36 which removably mates with a conventional locking mechanism within the bracket connector 19. This locking mechanism may include a push button release 37 for facilitating quick release of the bracket 14 from the bracket connector 19 in a conventional manner. The bracket 14 further includes a conventional threaded adapter 40 having a mounting knob 41 which is used for securing the camera to the bracket 14. The strap cover 21 has a recess 43 for accommodating the upper end of the hand strap 15. A screw cap cover 44 is provided which snaps within an aperture in the strap cover 21 to cover the head of the screw 20.

It will be apparent from FIGS. 3-4 that the components are assembled in the manner indicated in FIG. 3, and that the bracket 14 can be readily reversed to the opposite side (to the left side) of the body 11 of the grip 10 by reversing the bracket 14 and bracket connector 19 to the left side of the body 11, and by reversing the strap cover 21, upper end of the strap 15, screw 20 and screw cover 44 to the right side of the body 11. The lower end of the strap 15 is affixed to the lower end of the handle 12 by means of a fastener 48. This arrangement allows the strap 15, which may be formed of nylon web, to be pivoted about the fastener 48 so that the upper end thereof can be readily attached to either the right side or the left side of the body 11 of the grip 12. The upper end of the strap 15 may include several holes (through which the screw 20 extends) to allow the length of the strap 15 to be adjusted to the size of the photographer's hand.

The handle 12 of the pistol grip 10 may include a battery compartment (not shown) of generally conventional form. If this is included then the body 11 further includes a power outlet 50, on/off switch 51 and indicator light 52. The power outlet is provided for connecting a power cord (not shown) from the pistol grip to the associated electronic flash unit.

While the present invention has been illustrated and described with respect to a preferred embodiment thereof, variations will be apparent to those skilled in the art without departing from the spirit of the invention, and it is intended that all such variations be encompassed within the scope of the appended claims.

What is claimed is:

1. A pistol grip for photographic cameras, electronic flash units, and the like comprising
   a body having a handle extending therefrom, said body having an imagery vertical axis, and said handle being disposed at an angle with respect to the body, said body further including sides for receiving mounting means for a camera bracket, and
   mounting means for a camera bracket comprising bracket connector means for mating with one side of said body and fastener means for mounting with the other side of said body for securing together said fastening means and bracket connector means with the bracket connector means readily disposed on either side of said body.
2. A pistol grip as in claim 1 wherein
   said angle is between approximately thirty and sixty degrees.
3. A pistol grip as in claim 2 wherein
   said angle is approximately forty-five degrees, and said grip further includes a reversible hand strap.
4. A pistol grip as in claim 1 including
   hand strap means having a first end attached near the end of said handle remote from said body, and having a second end connectible with said fastener means to the side of said body opposite that with which the bracket connector is mated.
5. A pistol grip as in claim 4, wherein
   said angle is between approximately thirty and sixty degrees, and said pistol grip further includes bracket means connectible to said bracket connector means.
6. A pistol grip as in claim 5, including
   rotatable shoe means disposed on said body for receiving an electronic flash unit, and
   auxiliary power supply means disposed in said grip for providing power to an electronic flash unit.
7. A pistol grip for photographic cameras, electronic flash units, and the like comprising
   a body having a handle extending therefrom, said body having an imagery vertical axis and said handle being disposed at an angle of approximately forty-five degrees with respect to the body, said body further including sides either of which is arranged for receiving mounting means for a camera bracket,
   mounting means for a camera bracket comprising bracket connector means for mating with one side of said body and fastener means for mounting with the other side of said body for securing together said fastening means and bracket connector means with the bracket connector means readily disposed on either side of said body, and
   hand strap means having a first end attached near the end of said handle remote from said body, and having a second end connectible with said fastener means to the side of said body opposite that with which the bracket connector is mated.
8. A pistol grip as in claim 7, including
   rotatable shoe means disposed on said body for receiving an electronic flash unit, and
   auxiliary power supply means disposed in said grip for providing power to an electronic flash unit.

* * * * *